(12) United States Patent  
Long

(10) Patent No.: US 9,360,056 B2  
(45) Date of Patent: Jun. 7, 2016

(54) HYDRAULIC TRANSMISSION CONTROL SYSTEM AND METHOD THEREOF

(71) Applicant: Allison Transmission, Inc., Indianapolis, IN (US)

(72) Inventor: Charles F. Long, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 70 days.

(21) Appl. No.: 14/202,254

(22) Filed: Mar. 10, 2014

(65) Prior Publication Data

US 2015/0252859 A1 Sep. 10, 2015

(51) Int. Cl.
| | |
|---|---|
| F16D 48/02 | (2006.01) |
| F16H 57/04 | (2010.01) |
| F16H 61/14 | (2006.01) |
| F16H 61/00 | (2006.01) |
| F16H 61/4061 | (2010.01) |
| F16H 61/02 | (2006.01) |

(52) U.S. Cl.
CPC .............. F16D 25/14 (2013.01); F16D 48/02 (2013.01); *F16H 57/0434* (2013.01); *F16H 61/0003* (2013.01); *F16H 61/0213* (2013.01); *F16H 61/142* (2013.01); *F16H 61/4061* (2013.01)

(58) Field of Classification Search
None
See application file for complete search history.

(56) References Cited

U.S. PATENT DOCUMENTS

2009/0266068 A1* 10/2009 Long ......................... 60/339
2012/0247902 A1* 10/2012 Moorman ................ 192/3.58

FOREIGN PATENT DOCUMENTS

WO WO 2012177815 A1 * 12/2012

* cited by examiner

*Primary Examiner* — Justin Holmes
*Assistant Examiner* — Timothy M Hannon
(74) *Attorney, Agent, or Firm* — Taft Stettinius & Hollister LLP; Stephen F. Rost

(57) ABSTRACT

The present disclosure provides a method of controlling a transmission of a powered vehicle. The method includes determining if the powered vehicle is in a launch condition, activating a solenoid, controlling a hydraulic valve to a first position, and providing hydraulic pressure from at least one of a first hydraulic pump and a second hydraulic pump to the hydraulic valve. The method also includes controlling the hydraulic pressure through the hydraulic valve to a first clutch, determining if the launch condition is complete, deactivating the solenoid after the launch condition is complete, controlling the hydraulic valve from the first position to a second position, and substantially limiting hydraulic pressure from passing through the hydraulic valve to the first clutch.

18 Claims, 7 Drawing Sheets

|  | B1 308 | C1 302 | C2 304 | C3 306 | B2 310 | B3 312 |
| --- | --- | --- | --- | --- | --- | --- |
| 1st | X | X |  |  |  | X |
| 2nd |  | X | X |  |  | X |
| 3rd | X | X | X |  |  | X |
| 4th | X |  |  |  | X |  |
| 5th | X | X | X |  | X |  |
| 6th | X | X |  |  | X |  |
| 7th |  | X |  | X |  |  |
| 8th | X |  | X | X |  |  |
| 9th | X |  | X | X |  |  |

Fig. 5

HYDRAULIC TRANSMISSION CONTROL SYSTEM AND METHOD THEREOF

FIELD OF THE DISCLOSURE

The present disclosure relates to a transmission of a powered machine or vehicle. More particularly, the present disclosure relates to a hydraulic control system included in a transmission of a powered machine or vehicle.

BACKGROUND

Hydraulic fracturing or "fracking" is a drilling process by which natural gas and oil are mined from the earth. Manufacturers use hydraulic fracturing to stimulate wells and recover gas from sources underground. The process can require equipment to fracture or break underground rock formations to aid in the flow of oil or natural gas in areas that otherwise would be difficult to extract resources.

The "fracking" market is a quickly evolving market that continues to require large horsepower capabilities from powered machines to operate. In conventional arrangements, a fracture rig trailer is mounted behind a large machine or vehicle for pumping natural gas or oil from the ground. The machine or vehicle can include an engine, drive unit or other power-generating mechanism and a transmission. As the market continues to evolve both domestically and internationally, the power requirements continue to increase. With the need for additional power, more capability and performance is required from the transmission.

With additional power needed from the engine or drive unit and increased performance required from the transmission, important considerations such as clutch control, cooling, etc. are needed for optimal transmission operation. Moreover, different control mechanisms are under consideration for transferring power from the engine or drive unit to the transmission control system.

SUMMARY

In one embodiment of the present disclosure, a method is provided for controlling a transmission of a powered vehicle. The method includes providing a hydraulic control system that includes a hydraulic controls, a main hydraulic circuit, a lube circuit, and a cooler circuit, a first hydraulic pump, a second hydraulic pump, a first clutch of a plurality of selectably engageable clutches, a hydraulic valve disposed in the hydraulic controls, an electronic solenoid disposed in fluid communication with the hydraulic valve, and a controller for controlling the transmission; determining if the powered vehicle is in a launch condition; activating the electronic solenoid; controlling the hydraulic valve to a first position; providing hydraulic pressure from at least one of the first hydraulic pump and the second hydraulic pump to the hydraulic valve; controlling the hydraulic pressure through the hydraulic valve to the first clutch; determining if the launch condition is complete; deactivating the electronic solenoid after the launch condition is complete; controlling the hydraulic valve from the first position to a second position; and substantially limiting hydraulic pressure from passing through the hydraulic valve to the first clutch.

In one example of this embodiment, the method can include pumping hydraulic pressure into a first fluid path via the first hydraulic pump; pumping hydraulic pressure into a second fluid path via the second hydraulic pump; and fluidly coupling the hydraulic valve to the second fluid path. In a second example, the method can include fluidly coupling the main hydraulic circuit and the hydraulic controls with the first fluid path. In a third example, the method can also include fluidly coupling the first hydraulic pump to the hydraulic valve once the first fluid path reaches a full hydraulic capacity. In a fourth example, the method can further include fluidly coupling the cooler circuit and the lube circuit to the second fluid path.

In a fifth example, the method can include triggering a time delay once the controller determines the launch condition is complete. In a sixth example, the deactivating step is completed at an expiration of the time delay. In a seventh example, the controlling the hydraulic pressure comprises providing a first portion of hydraulic pressure to the first clutch and a second portion of hydraulic pressure to the cooler circuit and the lube circuit. In an eighth example, the method includes in the second position a majority of the first portion of hydraulic pressure is provided to the cooler circuit and the lube circuit. In a ninth example, the method can include providing a first amount of hydraulic pressure through a first flow path to the first clutch to selectively engage the first clutch; and providing a second amount of hydraulic pressure through a second flow path to the first clutch to selectively cool the first clutch during the launch condition; wherein, the second hydraulic pump and hydraulic valve are controllably fluidly coupled to the second flow path.

In another embodiment of the present disclosure, a powered vehicle is provided. The powered vehicle includes a drive unit for providing rotational power; a transmission operably coupled to the drive unit, the transmission including a hydraulic control system and a plurality of selectably engageable clutches, the hydraulic control system including a hydraulic controls, a main hydraulic circuit, a lube circuit, a cooler circuit, and a hydraulic reservoir; a first hydraulic pump fluidly coupled to the transmission, the first hydraulic pump being driven to produce a hydraulic pressure in a first fluid path, wherein the main hydraulic circuit and the hydraulic controls are fluidly coupled to the first fluid path; a second hydraulic pump fluidly coupled to the transmission, the second hydraulic pump being driven to produce a hydraulic pressure in a second fluid path; a first clutch of the plurality of selectably engageable clutches; a hydraulic valve fluidly disposed in the hydraulic controls, the hydraulic valve fluidly coupled to the first clutch and the second fluid path; a solenoid disposed in fluid communication with the hydraulic valve to control movement thereof; and a controller for controlling the transmission, the controller including a memory and a processor, wherein the controller is disposed in electrical communication with the drive unit and the hydraulic control system; wherein, the solenoid is electrically coupled to the controller and operably controllable to control movement of the hydraulic valve from a first position to a second position; further wherein, in the first position the first clutch is substantially fluidly coupled to the second fluid path, and in the second position the first clutch is substantially fluidly decoupled from the second fluid path.

In one example of this embodiment, the powered vehicle can include a cooler circuit and a lube circuit, the cooler circuit and lube circuit being fluidly coupled to the second flow path in the first and second positions. In a second example, the main circuit comprises a first hydraulic capacity; and the hydraulic controls comprises a second hydraulic capacity; further wherein, the first pump is fluidly coupled to the second flow path to provide hydraulic pressure to the hydraulic valve once the first and second hydraulic capacities are satisfied. In a third example, a first bypass circuit is fluidly coupled to the first hydraulic pump, wherein fluid recirculates between the first hydraulic pump and the first bypass circuit;

and a second bypass circuit is fluidly coupled to the second hydraulic pump, wherein fluid recirculates between the second hydraulic pump and the second bypass circuit. In a fourth example, a set of instructions is stored in the memory of the controller which are executable by the processor to determine if a launch condition is present, activate the electronic solenoid, control the hydraulic valve to the first position, control the first hydraulic pump to provide hydraulic pressure to the main hydraulic circuit and the hydraulic controls, control the second hydraulic pump to provide hydraulic pressure to the hydraulic valve, direct the hydraulic pressure from the second pump through the hydraulic valve to the first clutch, the cooler circuit, and the lube circuit, control the first pump to provide hydraulic pressure to the hydraulic valve after the main hydraulic circuit and hydraulic controls are pressurized to a threshold pressure, detect if the launch condition is completed, enable a time delay once the launch condition is completed, continue to provide hydraulic pressure to the first clutch until an expiration of the time delay, deactivate the electronic solenoid at the expiration of the time delay, control the hydraulic valve to the second position, continue providing hydraulic pressure to the cooler circuit and lube circuit, and substantially limit hydraulic pressure to the first clutch.

In a different embodiment, a transmission is provided for a powered vehicle. The transmission includes an input and an output; a hydraulic control system including a hydraulic controls, a main hydraulic circuit, a lube circuit, a cooler circuit, and a hydraulic reservoir; a plurality of torque-transmitting mechanisms selectively engageable to establish a plurality of different speed ratios between the input and the output; a first hydraulic pump fluidly coupled to the transmission, the first hydraulic pump being driven to produce a hydraulic pressure in the main hydraulic circuit and the hydraulic controls; a second hydraulic pump fluidly coupled to the transmission, the second hydraulic pump being driven to produce a hydraulic pressure in cooler circuit and the lube circuit; a first torque-transmitting mechanism of the plurality of the selectively engageable torque-transmitting mechanisms; a hydraulic valve fluidly disposed in the hydraulic controls, the hydraulic valve fluidly coupled to the first clutch and the second pump; a solenoid of the hydraulic controls disposed in fluid communication with the hydraulic valve to control movement thereof between a first position and a second position; and a controller for controlling the transmission and being disposed in electrical communication with the solenoid, the controller including a memory and a processor; wherein, the solenoid is operably controllable between an energized state and a de-energized state to control movement of the hydraulic valve; further wherein, in the energized state the solenoid controls movement of the hydraulic valve to the first position where the first torque-transmitting mechanism is substantially fluidly coupled to the hydraulic valve, and in the de-energized state the solenoid controls movement of the hydraulic valve to the second position where the first torque-transmitting mechanism is substantially fluidly de-coupled from the hydraulic valve.

In one example of this embodiment, in the first position a first portion of the hydraulic pressure from the second hydraulic pump is provided to the first torque-transmitting mechanism and a second portion of the hydraulic pressure is provided to the cooler and lube circuits, where the first portion is greater than the second portion; and in the second position the first portion of hydraulic pressure and the second portion are provided to the cooler and lube circuits. In a second example, the main hydraulic circuit and hydraulic controls each have a threshold capacity of hydraulic pressure, and once the threshold capacity of both circuits is satisfied, the first pump is fluidly coupled to the hydraulic valve. In a third example, the first torque-transmitting mechanism comprises a first inlet and a second inlet, the first inlet configured to receive hydraulic fluid for selective engagement, and the second inlet fluidly coupled to the hydraulic valve and configured to receive hydraulic fluid for cooling the first torque-transmitting mechanism during a launch event. In a fourth example, the memory of the controller stores a set of instructions which are executable by the processor to determine if a launch condition is present, energize the solenoid, control the hydraulic valve to the first position, control the first hydraulic pump to provide hydraulic pressure to the main hydraulic circuit and the hydraulic controls, control the second hydraulic pump to provide hydraulic pressure to the hydraulic valve, direct the hydraulic pressure from the second pump through the hydraulic valve to the first torque-transmitting mechanism, the cooler circuit, and the lube circuit, control the first pump to provide hydraulic pressure to the hydraulic valve after the main hydraulic circuit and hydraulic controls are pressurized to a threshold pressure, detect if the launch condition is completed, enable a time delay once the launch condition is completed, continue to provide hydraulic pressure to the first torque-transmitting mechanism until an expiration of the time delay, de-energize the solenoid at the expiration of the time delay, control the hydraulic valve to the second position, continue providing hydraulic pressure to the cooler circuit and lube circuit, and substantially limit hydraulic pressure from the first torque-transmitting mechanism.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5 is one embodiment of a table of selectable clutches and brakes for achieving a plurality of transmission ranges.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
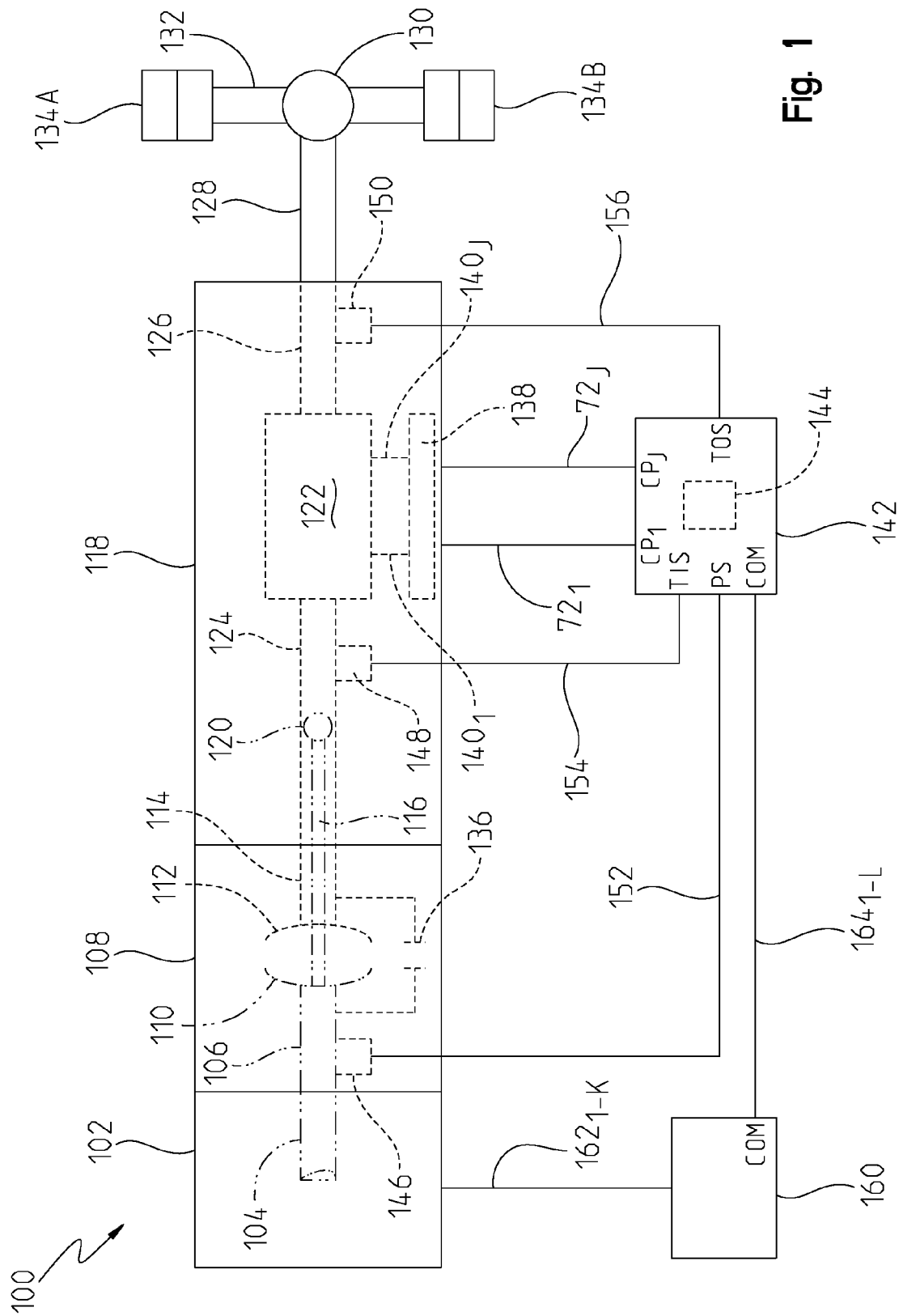
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114.

In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150. The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, 1-K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, 1-L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols.

As previously described, the fracking industry is an evolving industry. As power requirements continue to increase, additional performance and functionality is required of the transmission. For instance, some applications desire 4000 HP or more of power. With this additional power, embodiments of the present disclosure provide a system and method for handling the control and operation of the transmission to meet these requirements. In some embodiments, a control system can be modified to accommodate a launch clutch in place of a torque converter. Moreover, oil or fluid management of the control system and transmission can be adjusted to accommodate the increased cooling requirements of the transmission.

Figure 2:
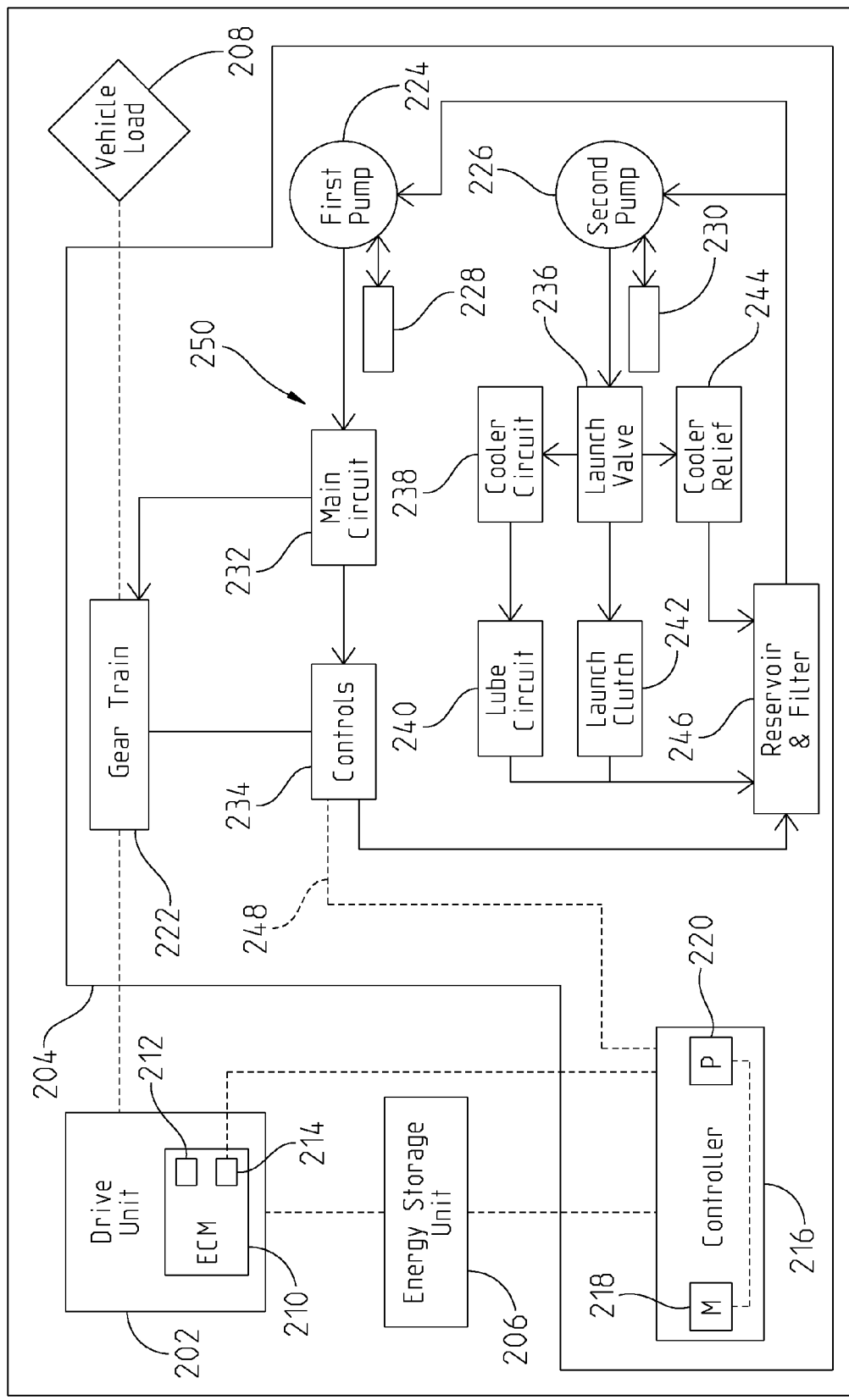
FIG. 2 a diagrammatic view of a vehicle including a drive unit and the transmission unit of FIG. 1 showing that the drive unit and the transmission unit cooperate to drive a vehicle load.

In an illustrated embodiment of FIG. 2 of the present disclosure, a transmission unit 204 is adapted for use in a powered machine or vehicle 200. The transmission 204 is configured to transmit torque from a drive unit 202 (e.g., an engine) to drive a vehicle load 208 (see FIG. 2) while the drive unit 202 is on (or running). The drive unit 202 can produce any range of power to drive the vehicle load 208. For example, the drive unit 202 can be capable of producing over 4000 HP in some fracking applications. The present disclosure is not intended to be limited by the capability of the drive unit 202.

In the illustrative embodiment, the powered machine or vehicle 200 can include the transmission unit 204, the drive unit 202, and an energy storage unit 206. The drive unit 202 is illustratively an internal combustion engine including an engine control module (ECM) 210 configured to control the operation of the drive unit 202. The engine control module 210 can include a memory unit 212 and a processor 214 for executing a set of instructions stored in the memory unit 214. The set of instructions can include one or more algorithms or logic steps for controlling the drive unit 202 and/or the transmission 204.

The energy storage unit 206 is illustratively embodied as a vehicle battery. In one instance, the energy storage unit 206 is a 12-volt battery that is electrically connected to an alternator. The energy storage unit 206 is electrically coupled to the drive unit 202 to be charged when the drive unit 202 is on and is electrically coupled to the transmission 204 to provide electrical power to any electrical components thereof.

The transmission 204 illustratively includes a gear train 222, a hydraulic control system 250, and a controller 216 as shown diagrammatically in FIG. 2. The gear train 222 can be reconfigurable among a plurality of gear ratios to transmit torque from the drive unit 202 to the vehicle load 208. In an alternative aspect, the gear train 222 may be reconfigurable among a plurality of speed ratios (e.g., in a continuously-variable transmission, an infinitely-variable transmission, etc.). The gear train 222 can include a plurality of selectable torque-transmission mechanisms, planetary (simple or complex) gearsets, shafts, etc. for achieving any of the aforementioned gear ratios and speed ratios.

The hydraulic control system 250 is configured to set the gear train 222 in one of the gear ratios or speed ratios as selected by the controller 216. The controller 216 is electrically coupled via one or more communication links 248 to the engine control module 210 and the hydraulic control system 250 as shown in FIG. 2. The controller 216 is configured to select a gear ratio or speed ratio for the gear train 222 and to direct operation of the hydraulic control system 250 based, at least in part, on information from the engine control module 210.

The hydraulic control system 250 can include a hydraulic control circuit 234, a hydraulic reservoir 246, a first hydraulic pump 224, and a second hydraulic pump 226 as shown in FIG. 2. The hydraulic control circuit, or simplified to hydraulic controls 234, can be configured to set the gear train 222 in one of the gear ratios or speed ratios as selected by the controller 216 by operating a plurality of valves and/or solenoids to engage and disengage a plurality of clutches (shown in FIG. 3). The hydraulic reservoir 246 can store hydraulic fluid for use in the hydraulic controls 234. The hydraulic reservoir 246 can be fluidly coupled to the hydraulic controls 234 through the first pump 224 to establish a fluid path for pressurized fluid to reach the hydraulic controls 234 and a main circuit 232 of the transmission 204. As shown, the first pump 224 is fluidly coupled to the reservoir 246 such that pressurized fluid can first be delivered to the main circuit 232 of the transmission for filling clutches, etc. Pressurized fluid can then be directed to the hydraulic controls 234, and excess fluid can be returned to the reservoir 246. In other embodiments, pressurized fluid can fill other circuits and the like (e.g., lube circuit, cooler circuit, etc.).

As also shown in FIG. 2, the hydraulic reservoir 246 is also fluidly coupled to a second hydraulic pump 226. The second hydraulic pump 226 is configured to drive a launch clutch 242 when the vehicle 200 is in a launch condition. For purposes of this disclosure, the launch condition can refer to when the vehicle or machine 200 is in a stopped or nearly stopped condition (e.g., vehicle speed is less than 5 mph). The launch condition can also be referred to as when the transmission 204 is in a neutral state and shifts to a drive state, or when the transmission is in a drive state but its output speed is approximately 0 RPM. The aforementioned speed values (i.e., vehicle speed and transmission output speed) are only provided as examples. The launch condition can also be defined based on engine or drive unit speed.

Figure 3A:
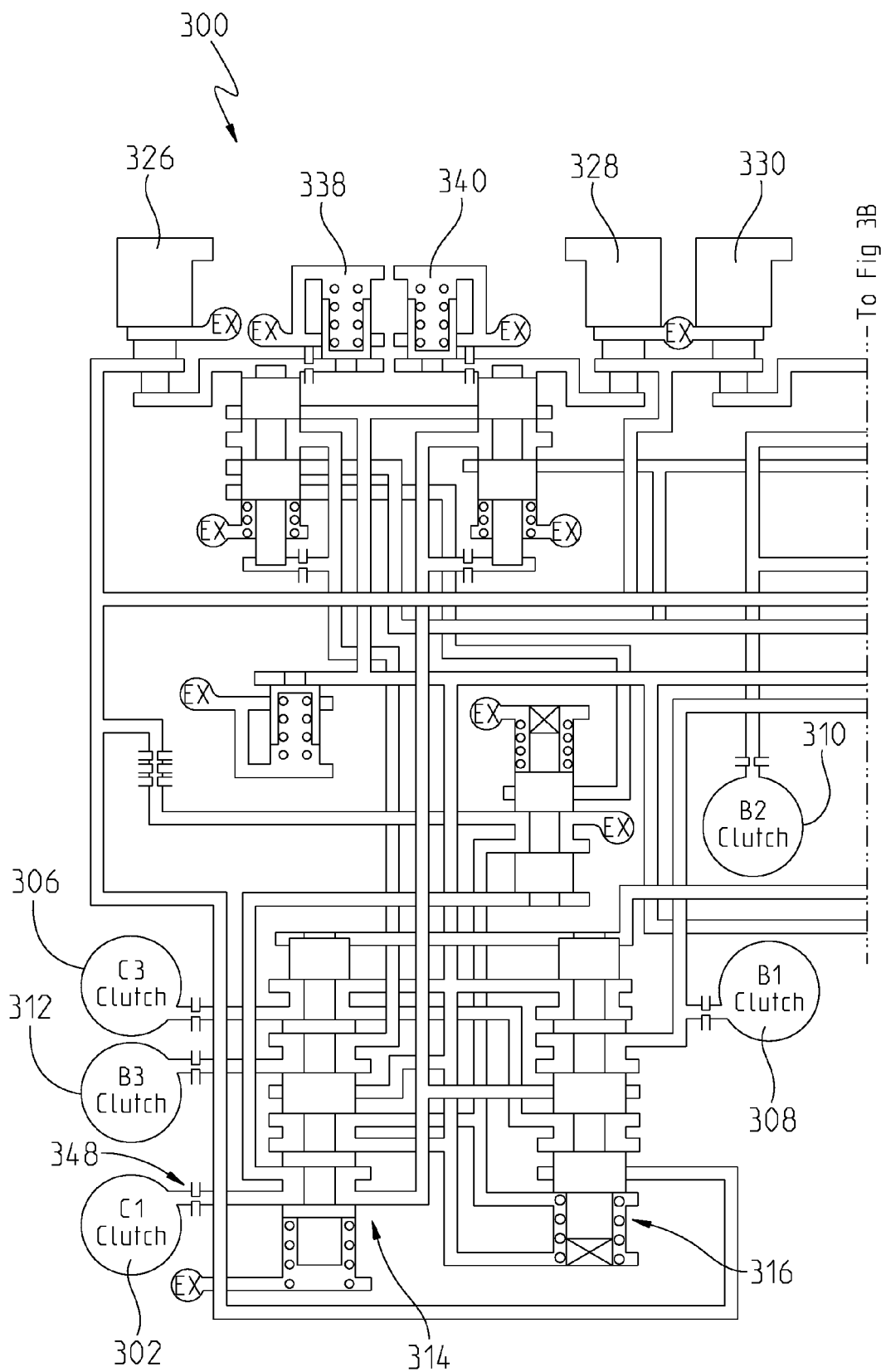
FIG. 3A is a first half of a schematic view of a hydraulic and electronic control system of the transmission assembly of FIG. 2.
Figure 3B:
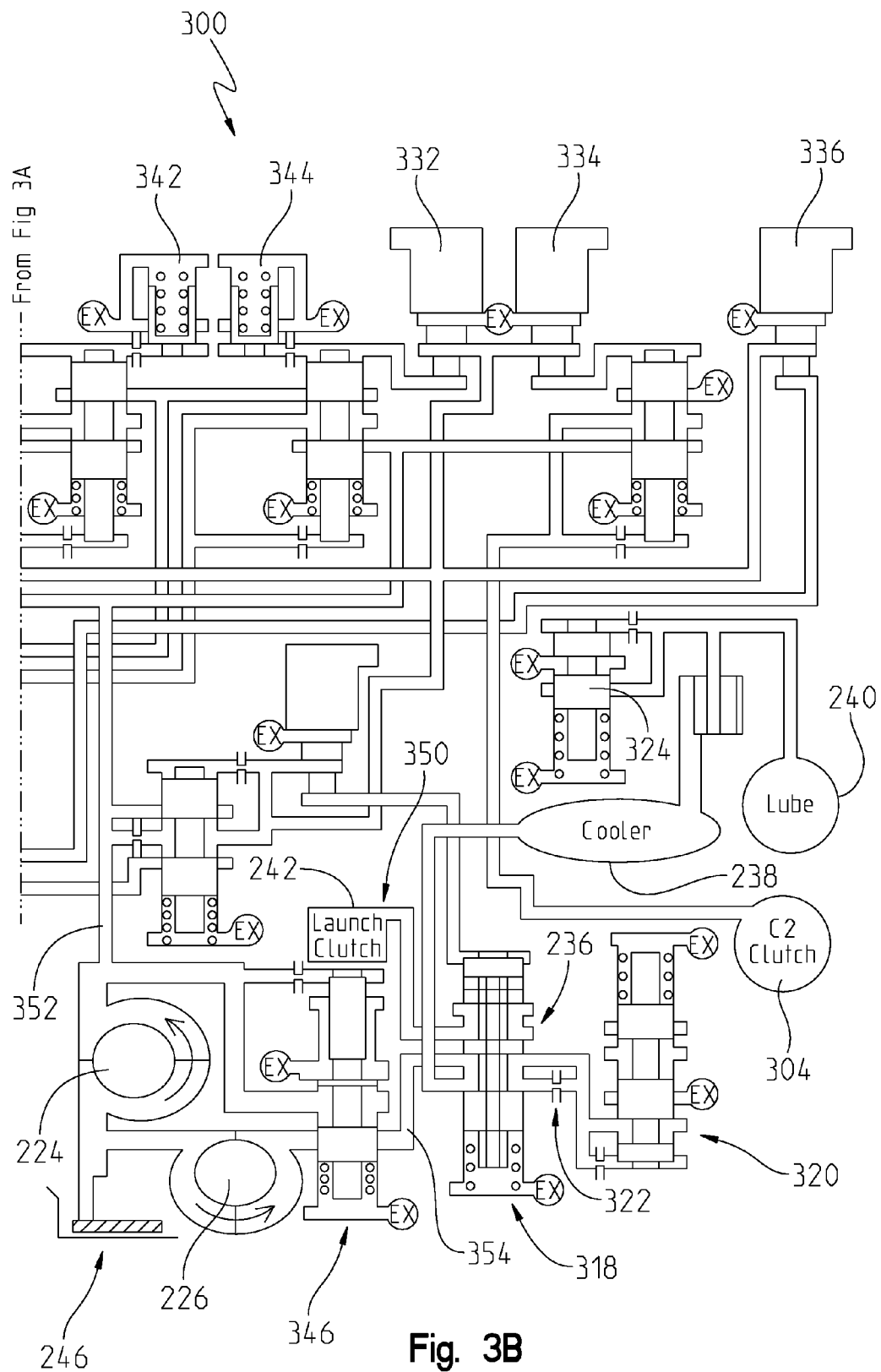
FIG. 3B is a second half of the schematic view of the hydraulic and electronic control system of the transmission assembly of FIG. 2.
Figure 4:
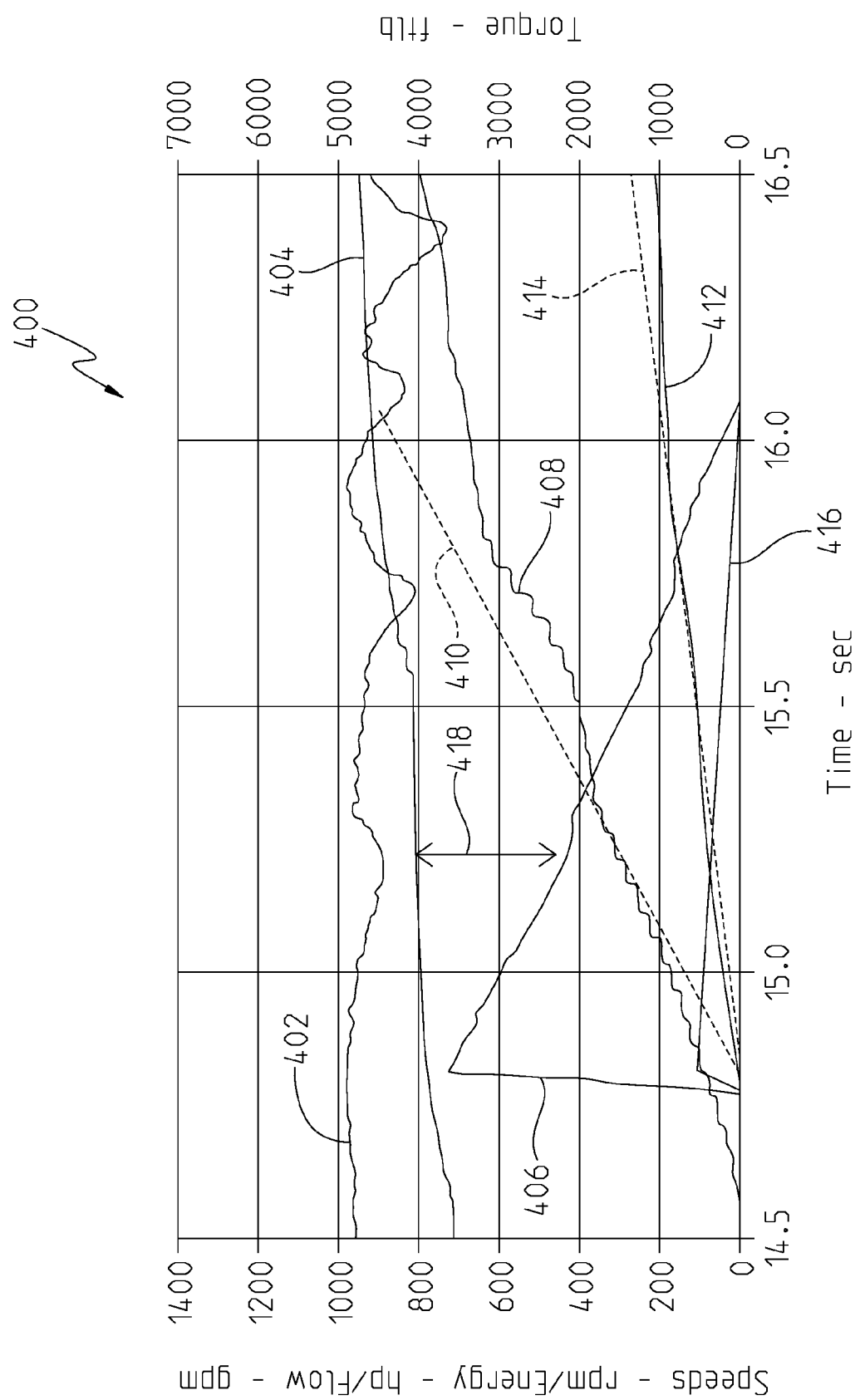
FIG. 4 is a graphical representation of a launch clutch engagement.

The control and operation of the launch clutch 242 is further described with respect to FIGS. 3 and 4. In any event, pressurized fluid from the second pump 226 can be directed to a launch valve 236 in the hydraulic controls 234. The launch valve 236 can control whether pressurized fluid is directed to the launch clutch 242, a cooler circuit 238, and a lube circuit 240 of the transmission 204. Fluid can also be transferred to a cooler relief port 244 in the hydraulic controls 234 as well. As such, pressurized fluid can fill each circuit, and once the respective circuits are filled, extra fluid can be exhausted back to the fluid reservoir 246. The fluid reservoir 246 can include a filter to separate contaminants and other debris from the fluid before the fluid returns to either the first pump 224 or the second pump 226.

As also shown, the first pump 224 can include a bypass or relief valve 228 to exhaust or relieve fluid therefrom. Similarly, the second pump 226 can also include a bypass or relief valve 230 fluidly coupled thereto. The bypass valves will be addressed further with respect to FIGS. 3 and 4.

Although not shown, the first pump 224 and the second pump 226 can be mounted externally of the transmission 204 such that hoses and other fluid lines can fluidly couple each pump to the hydraulic controls 234. For example, in one aspect, the hydraulic controls 234 can be incorporated into a main body and a solenoid body. The main body and solenoid (not shown) can include fluid passageways and channels for housing valves, solenoids, springs, etc. The fluid channels can include an inlet in either or both bodies for pressurized fluid to be received by the first pump 224 and the second pump 226.

In another embodiment, one or both of the first pump 224 and the second pump 226 can be coupled internally of the transmission 204. Moreover, each of the first pump 224 and the second pump 226 can be mounted off-axis relative to the transmission. For instance, if the transmission input and transmission output are aligned axially or coaxially, both pumps may be mounted at a location non-axial with respect to the input and output. This, however, is not required and the pumps may be mounted at various locations (internally or externally) so long as the appropriate level of fluid flow is provided to the hydraulic control system 250.

The controller 216 illustratively includes a memory 218 and a processor 220 coupled to the memory 218 and configured to perform instructions stored in the memory 218. In some embodiments, the controller 216 may be included in the engine control module 210 or may be formed from a plurality of control circuits located throughout the vehicle 200.

Referring now to FIG. 3, a detailed hydraulic diagram 300 of the hydraulic control system 250 included in the transmission unit 204 is shown. As shown in FIG. 3, the first hydraulic pump 224 can provide pressurized fluid to the main circuit 352 of the hydraulic control system 250. The main circuit 352 can include, for example, an internal main pressure regulator 346 (also known as a line pressure regulator). The regulator 346 is illustratively configured to regulate flow through the regulator 346 below a regulation pressure. Excess flow above the regulation pressure is diverted by the regulator 346 from being used to set the hydraulic control system 250 to one or more overflow components included in the main circuit 352 or to another circuit in the system 250. The regulator 346 can be fluidly coupled to the hydraulic reservoir 246 and to the second pump 226. Excess fluid, for example, can be directed to the outlet of the second pump 226 so that a combined pressurized fluid can be sent to the launch valve 236. The regulator 346 can be electrically coupled to the controller 216, and the controller 216 may operate the regulator 346 to set the regulation pressure.

As further shown in FIG. 3, the hydraulic controls 234 can include a plurality of solenoid valves 326, 328, 330, 332, 334, and 336, a plurality of clutches 302, 304, 306, 308, 310, and 312, and a plurality of valves 314, 316, 338, 340, 342, and 344. These components of the hydraulic control system 250, and in particular the hydraulic controls 234, are arranged and configured to provide a number of reverse, neutral, and forward drive transmission ranges as is known in the art.

In the illustrative embodiment, one or more of the plurality of valves of the hydraulic controls 234 can be embodied as logic valves that include switches (not shown) situated in pressure bulbs associated with the respective valve. The switches can be configured to detect whether the pressure supplied to the respective valve is at, or above, a hold threshold pressure.

As shown in FIG. 3, the lube circuit 240 can be operably controlled by a lube regulator valve 324. As pressurized fluid fills the lube circuit 240, the regulator 324 can detect once the necessary amount of fluid has been provided for lubrication and excess fluid can be exhausted to the fluid reservoir 246.

The hydraulic control system 250 can also include a converter flow valve 318 and a converter regulator or relief valve 320. In this manner, the amount of flow to and from a conventional torque converter can be regulated to ensure pressurized fluid is delivered to the torque converter as necessary. Although the valves can be used for a conventional torque converter, the flexibility of the hydraulic control system 250 is that the hydraulic controls 234 may also be used when a launch clutch 242 is used to control the transmission at a launch condition rather than a conventional torque converter. For purposes of this disclosure, the converter flow valve 318 can be used as the launch valve 236 when the launch clutch 242 (and not the torque converter) is used for launch. Thus, the converter flow valve and launch valve are the same valve as described herein, but launch valve 236 is used primarily to describe when a launch clutch 242 is applicable and the converter flow valve 318 is used when a torque converter is applicable.

Although in FIG. 3 the launch clutch 242 is shown as its own clutch, the C1 clutch 302 can be operably controlled as the launch clutch. Likewise, when a torque converter is not used, the converter flow valve 318 can be used as the launch valve 236 as described in FIG. 2. A bypass orifice 322 is shown fluidly coupled to the converter flow valve 318 to assist with controlling fluid flow to the cooler and lube circuits during a launch event. With the C1 clutch 302 being used as the launch clutch, a first feed orifice or inlet 348 can control the engagement and disengagement of the clutch (via a piston) and a second feed orifice or inlet 322 can control the cooling of the clutch. For example, during a launch event, fluid flow from the second pump 226 (and at times from the first pump 224) can be directed to the grooves in a plurality of clutch plates that form the launch clutch 242. In addition, the size of the second feed orifice or inlet 322 can determine an amount of fluid flow therethrough so that a portion of the flow is directed to the cooler circuit 238 and the lube circuit 240. When the launch event is over, the launch valve 236 can stroke so that most, if not all, of the fluid flow from the second pump 226 (and possibly the first pump 224) is directed to the cooler circuit 238 and the lube 240. The engagement and disengagement of the C1 clutch 302 can be controlled according to conventional means, including but not limited to one of the plurality of valves (e.g., valves 314, 316, etc.) and one of the plurality of solenoid valves (e.g., 326, 328, 330, 332, 334, 336, etc.).

In the hydraulic control system 250 of the present disclosure, the controller 216 can operably control the hydraulic controls 234, including the launch valve 236, to effectively control the temperature of the launch clutch. To do so, the system 250 includes the first pump 224 and the second pump 226, both of which can provide a substantial amount of fluid into the system 250 such that the controller 216 can control how the fluid is directed therethrough. As described above, pressurized fluid from the first pump 224 can be introduced into the hydraulic control system 250 at a first location (i.e., into a first flow path 352) and pressurized fluid from the second pump 226 can be introduced into the system 250 at a second location (i.e., into a second flow path 354) to allow the controller 216 to better manage the fluid flow in the system.

As described, the launch valve 236 (i.e., converter flow valve 318 in FIG. 3) can be used to either control a conventional torque converter or the launch clutch 242. The bypass circuit 322, which is fluidly coupled to the launch valve 236, can be used to manage or control the amount of fluid that is delivered to the lube circuit 240. During a launch event, a substantial portion of the fluid flow is directed to the launch clutch 242 to assist with cooling efforts. Likewise, the first pump 224 can provide sufficient fluid to satisfy demands in the main circuit 352 and hydraulic controls 234, and any additional fluid can be directed to the launch clutch 242, cooler circuit 238, or lube circuit 240. In this manner, the first pump 224 and second pump 226 can operate simultaneously and the first pump 224 can provide additional fluid to the second pump 226 to cool the launch clutch 242 or supply the cooler and lube circuits, as necessary. Moreover, the bypass or relief valves (e.g., 228 and 230) fluidly coupled to each pump can allow for excess fluid to be recirculated to the suction side of each pump for later use.

In one non-limiting example, the first pump 224 and the second pump 226 may each be capable of providing approximately 45-50 gallons per minute (gpm) of fluid flow to the hydraulic control system 250. For purposes of cooling the launch clutch 242, approximately 45 gallons per minute (gpm) of fluid flow can be provided by the two pumps. The second pump 226, for example, may provide approximately 30 gpm and the first pump 224 may provide approximately 15 gpm. These flow rates can vary for different hydraulic control systems, type of pump, and cooling requirements of the launch clutch. In other words, these flow rates are only provided as an example and are not intended to limit the scope of this disclosure.

The aforementioned bypass orifice or bypass circuit 322 can also impact flow to the launch clutch. For instance, a smaller bypass orifice results in more fluid flow being pumped to the launch clutch 242 rather than the lube circuit 240. A larger bypass orifice can result in greater fluid flow being pumped to the lube circuit 240 and less fluid flow to the launch clutch 242. Therefore, depending on the size of the launch clutch and the amount of fluid flow required to cool the clutch, the bypass orifice size can be sized accordingly.

As previously described, the control of pressurized fluid for cooling the launch clutch 242 can be controlled by the launch valve 236, e.g., the converter flow valve 318 in FIG. 3. The movement of the launch valve 236 between a first position and a second position can control where pressurized fluid is directed within the hydraulic controls 234. In FIGS. 2 and 3, one of the plurality of solenoids can be electrically controlled by the controller 216 to control movement of the launch valve 236. For example, a solenoid 328 can be electrically coupled to the controller 216 such that the controller 216 can electrically communicate signals to the solenoid 328 during operation. A signal from the controller 216 can cause the launch valve 236 to shift between the first and second positions, based on current conditions of the vehicle or machine 200.

In the first position, for example, pressurized fluid flow from the second pump 226 can be directed to the launch clutch 242 via the launch valve 236. This first position may be referred to as an energized state or active state. In this position or state, the controller 212 may receive information from the ECM 210 that indicates the machine or vehicle 200 is in a launch condition. Alternatively, the controller 212 may determine this condition without any communication from the ECM 210. A set of instructions stored in the memory 218 of the controller 212 may also instruct the processor to execute the necessary steps for energizing the solenoid 328 and shifting the launch valve 236 to the first position. In any event, the controller 212 is able to detect a launch condition and appropriately move the launch valve 236 to the first position so that a desired amount of fluid flow from the second pump 226 (and first pump 224) is pumped to the launch clutch 242 for cooling.

Once the launch clutch 242 is sufficiently cooled and the launch condition is completed, the controller 212 can communicate with the solenoid 328 to shift the launch valve 236 to the second position. In this second position, the solenoid 328 may be de-energized or deactivated. One skilled in the art will understand that the solenoid 328 may be energized or de-energized in the first or second position. Therefore, the first position can be reached when the solenoid is either energized or de-energized, and vice versa in the second position. In the second position, the fluid passage between the launch valve 236 and the launch clutch 242 can be substantially blocked such that pressurized fluid is directed primarily to the cooler circuit 238 and the lube circuit 240. In this position, the vehicle or machine 200 may be operating under normal operating conditions. Once the cooler and lube circuits are satisfied, excess fluid can be exhausted to the fluid reservoir 246 or the suction side of either or both hydraulic pumps.

In this manner, the controller 212 can adequately manage the fluid in the hydraulic control system at both a launch condition and under normal operating conditions. This is also illustrated in a non-limiting example of FIG. 4. In FIG. 4, a graphical representation of a launch condition 400 is shown. In addition, several features related to an embodiment in which a launch clutch is not used, but rather a conventional torque converter is used.

For instance, the schematic illustrates an input speed curve 404. The input speed curve 404 can refer to engine speed, drive unit speed, or a transmission input speed. Likewise, an output speed curve 412 is also shown. This can be a transmission output speed or vehicle speed, A turbine speed curve 408 is also shown. The turbine speed curve 408 is representative of a conventional torque converter being used. In addition, a transmission output torque curve 402 is illustrated in FIG. 4.

In a launch clutch application, a clutch energy curve 406 and clutch flow curve 416 are shown. In this application, an acceleration curve 414 is shown representative of approximately 160 rpm/sec. Moreover, the engagement of the launch clutch during a launch condition will produce a selectable gear ratio. This gear ratio is illustratively shown as curve 410 in FIG. 4. The gap or space 418 between the input speed curve 404 and the fixed ratio curve 410 defines an area of clutch slip. During this time period where there is clutch slip, the launch clutch generates a substantial amount of heat and therefore the hydraulic pumps are required to produce enough fluid flow to cool the launch clutch. As shown in this example, the launch condition may occur when input speed is less than 800 rpm and may last less than 2 seconds. Input speed may be higher if higher engine or drive unit power is needed for a high output load 208. During this time, the controller 212 can control the amount of fluid flow from the hydraulic pumps to control the cooling of the launch clutch. Due to the quick rise in clutch energy, the amount of fluid flow for cooling the launch clutch may not be sufficient at the end of the launch event, and therefore the controller 212 may initiate a time delay whereby fluid flow continues to be directed to the launch clutch for cooling even after the launch event concludes. Once the time delay expires, the controller 212 can control the launch valve such that fluid flow is directed away from the launch clutch and is sent to the cooler circuit and lube circuit, as described previously.

Figure 6:
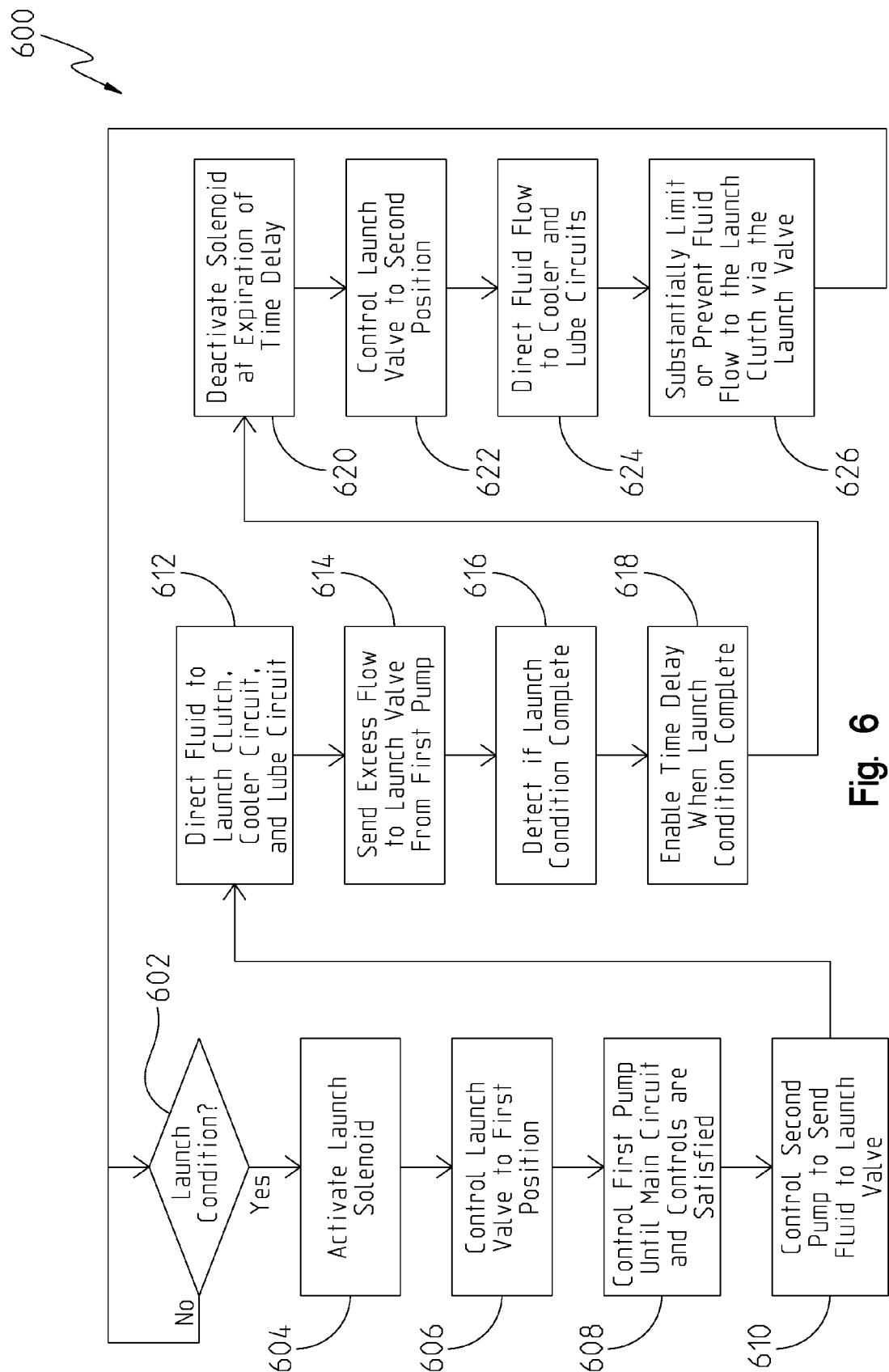
FIG. 6 is a flow diagram of a controller-implemented process for handling fluid management in a hydraulic control system.

Thus, the present disclosure provides a controller-implemented process for handling fluid management in the hydraulic control system 250 to provide pressurized fluid in a plurality of different circuits and to cool the launch clutch. One embodiment of this process 600 is further shown in FIG. 6. The process 600 is shown including a plurality of different blocks for execution by the controller 212 or another element described in this disclosure. In other embodiments, there may be additional or fewer blocks for execution. Thus, the process 600 in FIG. 6 is only one example. The process 600, and any and all variations to it, can be stored in the memory 218 as a set of instructions such that the processor 220 executes the set of instructions of the process 600.

Turning to FIG. 6, the process 600 can include a first block 602 for execution by the processor 220 where the controller 212 detects if a launch condition is present. This determination can be made by measuring or determining input speed, engine speed, transmission output speed, or vehicle speed. A threshold speed, for example, can be stored in the memory 218 of the controller 212 such that the processor 220 can communicate with the ECM 210 or a speed sensor to determine the input, engine, transmission output, or vehicle speed. The processor 220 can compare the speed with the threshold speed, and if the speed is at or below the threshold speed, the processor 220 can determine that a launch condition is present. Otherwise, the processor 220 can determine that the machine or vehicle 200 is not operating at a launch condition and therefore block 602 can be repeated until a launch condition is determined.

While input speed, engine speed, transmission output speed, and vehicle speed are mentioned as being factors in determining a launch event, there may be other conditions that factor in the execution of block 602. For instance, the controller may determine a throttle position, a brake condition, shift selector movement to drive, etc. The execution of block 602 therefore may require the controller 212 to compare one or more of input or engine speed to an input speed threshold, a transmission output speed to a transmission output speed threshold, a vehicle speed to a vehicle speed threshold, a throttle position to a throttle position threshold, a brake condition to a braking threshold, shift selector movement to drive, etc.

If, in block 602 the controller 212 determines a launch condition is active, the controller can execute block 604 by sending a signal to the launch solenoid 328. The signal can be communicated over a communication link 248 such that the solenoid is either energized or de-energized. When a launch condition is detected, the launch solenoid 328 is triggered to move the launch valve to a position so that pressurized fluid is directed to the launch clutch for cooling. Thus, whether the solenoid is energized or de-energized is of little consequence so long as the execution of block 604 triggers a sequence of events whereby the launch clutch receives pressurized fluid.

In other words, once the launch solenoid 328 is triggered or activated in block 604, a corresponding communication is sent to the launch valve 236 to move it to a first position in block 606. The activation in block 604 can induce fluid in the hydraulic controls 234 to force or move the launch valve 236. In doing so, blocks 608 and 610 can be executed by controlling the first and second pumps. The first pump 224 can pump pressurized fluid to the main circuit 232 and hydraulic controls 234. The second pump 226 can pump pressurized fluid to the launch clutch 242. In block 608, for example, pressurized fluid can be pumped into the main circuit 232 and hydraulic controls 234 until the flow requirements of each circuit are satisfied. Likewise, in block 610, the second pump 226 can pump fluid to the launch clutch, and depending on the size of the bypass orifice 322, a portion of the pressurized fluid can be directed to the cooler circuit 238 and lube 240 in block 612. Once the main circuit 232 and hydraulic controls 234 are satisfied with fluid flow, excess pressurized fluid can be directed to the launch valve 236 in block 614.

In one aspect, approximately 100 gpm of pressurized fluid can be produced by the first and second pumps, and nearly half of that amount can be directed to the launch clutch 242 for cooling during the launch event. As the controller 212 executes blocks 604-614, the controller 212 can further execute block 616 to detect if the launch condition or event is over. This may be detected in the form of a timing mechanism, a comparison of transmission input speed to transmission output speed, transmission input speed to engine speed, clutch energy, etc. Until the launch event is complete, however, the conditions set forth in blocks 608-614 are continuously executed for cooling the launch clutch 242.

Once the controller 212 determines that the launch event is over in block 616, the controller 212 can trigger or start a time delay in block 618. For example, a clock or timer may be internally disposed within the controller 212. The conditions in blocks 608-614 are continuously performed during the time delay, i.e., pressurized fluid from at least the second pump 226, and likely the first pump 224 as well, is pumped to the launch clutch 242 for cooling.

At the expiration of the time delay, the controller 212 can execute block 620 by deactivating the launch solenoid 328. Similar to block 604, a signal can be sent from the controller 212 to the launch solenoid 328 to deactivate it. Once deactivated, block 622 can be executed by controlling the launch valve 236 from the first position to the second position. Upon execution of block 622, the fluid path through the launch valve 236 to the launch clutch 242 is substantially blocked and most, if not all, of the pressurized fluid from at least the second pump 226 is directed to the cooler circuit 238 and lube circuit 240. Due to leakage in the hydraulic control system 250, a small portion of pressurized fluid may still leak past the launch valve 238 and reach the launch clutch 242, but a substantial portion of the fluid is blocked from going to the launch clutch 242 in block 626.

Once the cooler circuit 238 and lube circuit 240 are satisfied with fluid flow, excess fluid can be dumped or exhausted back to the suction side of the pump or to the fluid reservoir 246. During the course of executing process 600, additional or excess fluid at either the first pump 224 or second pump 226 can be recirculated through a bypass or relief circuit 228, 230, respectively, such that the pressurized fluid flows through the bypass circuit and returns to the suction side of the respective pump.

Another aspect of the present disclosure is the ability to multiplex two or more clutches within a single pressure trim system. Here, a single trim system can be provided with a logic valve (i.e., a switching transistor) that fluidly couples a trim system to one of two selectively-engageable clutches, but not both at a given instance in time. In other words, two or more selectively-engageable clutches can be controlled within the same trim system via the same logic valve. The logic valve can be controlled by a solenoid, and the solenoid can be electrically coupled and controlled by the controller 212. In the present disclosure, a single logic valve is controlled by an on/off solenoid to control the flow of pressurized fluid between a first clutch and a second clutch.

The multiplexing achieved in the present disclosure can be described with reference to FIGS. 2, 3, and 5. In FIG. 5, a chart 500 is shown illustrating one example of the transmission 204 being configured to achieve at least nine different ranges, where each range can be correspond to a forward or reverse speed. Each range, i.e., forward or reverse speed, can be achieved by the selective engagement of six torque-transmitting mechanisms. Each torque-transmission mechanism can include either a clutch or brake. The clutch or brake may be either rotating or stationary, but for purposes of this disclosure the term clutch or brake can be interchangeable in terms of how it relates to multiplexing.

In this illustrative example, the six torque-transmission mechanisms include a first clutch 302 (C1 clutch), a second clutch 304 (C2 clutch), a third clutch 306 (C3 clutch), a first brake 308 (B1 brake), a second brake 310 (B2 brake), and a third brake 312 (B3 brake). In other embodiments, there can be any number of clutches or brakes. For purposes of multiplexing, however, there is at least two clutches, two brakes, or one of each.

In FIG. 3, one or more of the plurality of solenoid valves 326, 328, 330, 332, 334, and 336 can form part of a trim system and control the selective engagement of each of the clutches and brakes. In the first range, the first clutch 302, the first brake 308, and the third brake 312 can be selectively engaged. In this range, the second clutch 304, the third clutch 306, and the second brake 310 are selectively disengaged. As previously described, the first clutch 302 can also function as the launch clutch for purposes of this disclosure, although in other embodiments a different clutch may be used for the launch clutch.

In the second range, the first clutch 302, the second clutch 304, and the third brake 312 are selectively engaged and the first brake 308, the third clutch 306, and the second brake 310 are selectively disengaged. In the third range, the first brake 308, the second clutch 304, and the third brake 312 are selectively engaged and the first clutch 302, the third clutch 306, and the second brake 310 are selectively disengaged. In the fourth range, the first clutch 302, the first brake 308, and the second brake 310 are selectively engaged and the second clutch 304, the third clutch 306, and the third brake 312 are selectively disengaged. In the fifth range, the first clutch 302, the second clutch 304, and the second brake 310 are selectively engaged and the first brake 308, the third clutch 306, and the third brake 312 are selectively disengaged.

In the sixth range, the first brake 308, the second clutch 304, and the second brake 310 are selectively engaged and the first clutch 302, the third clutch 306, and the third brake 312 are selectively disengaged. In the seventh range, the first clutch 302, the first brake 308, and the third clutch 306 are selectively engaged and the second clutch 304, the second brake 310, and the third brake 312 are selectively disengaged. In the eighth range, the first clutch 302, the second clutch 304, and the third clutch 306 are selectively engaged and the first brake 308, the second brake 310, and the third brake 312 are selectively disengaged. In the ninth range, the first brake 308, the second clutch 304, and the third clutch 306 are selectively engaged and the first clutch 302, the second brake 310, and the third brake 312 are selectively disengaged.

The selective engagement and disengagement of FIG. 5 is only illustrated as an example, and is not intended to limit the present disclosure. As shown in FIG. 5, either the third clutch 306 or the third brake 312 is selectively engaged in six of the nine ranges. Both are selectively disengaged in the other three ranges. However, both of the third clutch 306 and the third brake 312 are not selectively engaged at the same time. This enables a first solenoid 326 to control the same trim system for both the third clutch 306 and the third brake 312. For example, the controller 212 can send a signal to energize or de-energize the first solenoid 326 to control movement of a logic valve so that pressurized fluid fills either the third clutch 306 or third brake 312 for selective engagement. Similarly, a shift to a different range (e.g., from third range to fourth range or vice versa) can result in the selective disengagement of the third clutch 306 or third brake 312. The logic valve therefore can be used to control the fill of the third clutch 306 or third brake 312 to provide better shift quality of the transmission.

In this example, the selective engagement of the first clutch 302 can be achieved by the electronic control of a second solenoid 328. The selective engagement of the second clutch 304 can be achieved by electronic control of a third solenoid 334. The selective engagement of the first brake 308 can be achieved by electronic control of a fourth solenoid 332. Similarly, the selective engagement of the second brake 310 can be achieved by the electronic control of a fifth solenoid 330. A sixth solenoid 336 can be used to control movement of the valve 314 in FIG. 3. In at least one embodiment, the valve 314 can be a logic valve that controls the manner in which pressurized fluid is directed in the hydraulic controls 234.

The embodiments of the present disclosure provide examples of multiplexing between two clutches, two brakes, or one clutch and one brake. In addition, these embodiments illustrate the use of a controller 212 to control multiplexing, a launch clutch, and oil management between two hydraulic pumps and a complex hydraulic control system 250. These embodiments further illustrate the control of a single valve in a converter mode (i.e., where a conventional torque converter is used) and a launch clutch mode (i.e., where a launch clutch is used for vehicle launch).

While embodiments incorporating the principles of the present disclosure have been discussed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

I claim:

1. A method of controlling a transmission of a powered vehicle, comprising:
    providing a hydraulic control system that includes a hydraulic controls, a main hydraulic circuit, a lube circuit, and a cooler circuit, a first hydraulic pump, a second hydraulic pump, a first clutch of a plurality of selectably engageable clutches, a hydraulic valve disposed in the hydraulic controls, an electronic solenoid disposed in fluid communication with the hydraulic valve, and a controller for controlling the transmission;
    determining if the powered vehicle is in a launch condition;
    activating the electronic solenoid;
    controlling the hydraulic valve to a first position;
    providing hydraulic pressure from at least one of the first hydraulic pump and the second hydraulic pump to the hydraulic valve;
    controlling the hydraulic pressure through the hydraulic valve to the first clutch;
    determining if the launch condition is complete;
    triggering a time delay once the controller determines the launch condition is complete;
    deactivating the electronic solenoid after the launch condition is complete;
    controlling the hydraulic valve from the first position to a second position; and
    substantially limiting hydraulic pressure from passing through the hydraulic valve to the first clutch.

2. The method of claim 1, further comprising:
    pumping hydraulic pressure into a first fluid path via the first hydraulic pump;
    pumping hydraulic pressure into a second fluid path via the second hydraulic pump; and
    fluidly coupling the hydraulic valve to the second fluid path.

3. The method of claim 2, further comprising fluidly coupling the main hydraulic circuit and the hydraulic controls with the first fluid path.

4. The method of claim 2, further comprising fluidly coupling the first hydraulic pump to the hydraulic valve once the first fluid path reaches a full hydraulic capacity.

5. The method of claim 2, further comprising fluidly coupling the cooler circuit and the lube circuit to the second fluid path.

6. The method of claim 1, wherein the controlling the hydraulic pressure comprises providing a first portion of hydraulic pressure to the first clutch and a second portion of hydraulic pressure to the cooler circuit and the lube circuit.

7. The method of claim 6, wherein in the second position a majority of the first portion of hydraulic pressure is provided to the cooler circuit and the lube circuit.

8. The method of claim 1, further comprising:
    providing a first amount of hydraulic pressure through a first flow path to the first clutch to selectively engage the first clutch; and
    providing a second amount of hydraulic pressure through a second flow path to the first clutch to selectively cool the first clutch during the launch condition;
    wherein, the second hydraulic pump and hydraulic valve are controllably fluidly coupled to the second flow path.

9. A transmission system for a powered vehicle, comprising:
    an input and an output;
    a hydraulic control system including a hydraulic controls, a main hydraulic circuit, a lube circuit, a cooler circuit, and a hydraulic reservoir;
    a plurality of torque-transmitting mechanisms selectively engageable to establish a plurality of different speed ratios between the input and the output;
    a first hydraulic pump fluidly coupled to the transmission, the first hydraulic pump being driven to produce a hydraulic pressure in the main hydraulic circuit and the hydraulic controls;
    a second hydraulic pump fluidly coupled to the transmission, the second hydraulic pump being driven to produce a hydraulic pressure in cooler circuit and the lube circuit;
    a first torque-transmitting mechanism of the plurality of the selectively engageable torque-transmitting mechanisms;
    a hydraulic valve fluidly disposed in the hydraulic controls, the hydraulic valve fluidly coupled to the first torque-transmitting mechanism and the second pump;
    a solenoid of the hydraulic controls disposed in fluid communication with the hydraulic valve to control movement thereof between a first position and a second position; and
    a controller for controlling the transmission and being disposed in electrical communication with the solenoid, the controller including a memory and a processor;
    wherein, the memory of the controller stores a set of instructions which are executable by the processor to determine if a launch condition is present, energize the solenoid, control the hydraulic valve to the first position, control the first hydraulic pump to provide hydraulic pressure to the main hydraulic circuit and the hydraulic controls, control the second hydraulic pump to provide hydraulic pressure to the hydraulic valve, direct the hydraulic pressure from the second pump through the hydraulic valve to the first torque-transmitting mechanism, the cooler circuit, and the lube circuit, control the first pump to provide hydraulic pressure to the hydraulic valve after the main hydraulic circuit and hydraulic controls are pressurized to a threshold pressure, detect if the launch condition is completed, enable a time delay once the launch condition is completed, continue to provide hydraulic pressure to the first torque-transmitting mechanism until an expiration of the time delay, de-energize the solenoid at the expiration of the time delay, control the hydraulic valve to the second position, continue providing hydraulic pressure to the cooler circuit and lube circuit, and substantially limit hydraulic pressure from the first torque-transmitting mechanism;

wherein, the solenoid is operably controllable between an energized state and a de-energized state to control movement of the hydraulic valve;

further wherein, in the energized state the solenoid controls movement of the hydraulic valve to the first position where the first torque-transmitting mechanism is substantially fluidly coupled to the hydraulic valve, and in the de-energized state the solenoid controls movement of the hydraulic valve to the second position where the first torque-transmitting mechanism is substantially fluidly de-coupled from the hydraulic valve.

10. The transmission system of claim 9, wherein:

in the first position a first portion of the hydraulic pressure from the second hydraulic pump is provided to the first torque-transmitting mechanism and a second portion of the hydraulic pressure is provided to the cooler and lube circuits, where the first portion is greater than the second portion; and in the second position the first portion of hydraulic pressure and the second portion are provided to the cooler and lube circuits.

11. The transmission system of claim 9, wherein the main hydraulic circuit and hydraulic controls each have a threshold capacity of hydraulic pressure, and once the threshold capacity of both circuits is satisfied, the first pump is fluidly coupled to the hydraulic valve.

12. The transmission system of claim 9, wherein the first torque-transmitting mechanism is fluidly coupled to the hydraulic valve and configured to receive hydraulic fluid for cooling the first torque-transmitting mechanism during a launch event.

13. A method of controlling a transmission of a powered vehicle, comprising:

providing a hydraulic control system that includes a hydraulic controls, a main hydraulic circuit, a lube circuit, and a cooler circuit, a first hydraulic pump, a second hydraulic pump, a first clutch of a plurality of selectably engageable clutches, a hydraulic valve disposed in the hydraulic controls, an electronic solenoid disposed in fluid communication with the hydraulic valve, and a controller for controlling the transmission;

determining if the powered vehicle is in a launch condition;

activating the electronic solenoid;

controlling the hydraulic valve to a first position;

providing hydraulic pressure from at least one of the first hydraulic pump and the second hydraulic pump to the hydraulic valve;

controlling the hydraulic pressure through the hydraulic valve to the first clutch;

determining if the launch condition is complete;

triggering a time delay once the controller determines the launch condition is complete;

deactivating the electronic solenoid after the launch condition is complete, wherein the deactivating step is completed at an expiration of the time delay;

controlling the hydraulic valve from the first position to a second position; and substantially limiting hydraulic pressure from passing through the hydraulic valve to the first clutch.

14. The method of claim 13, further comprising:

pumping hydraulic pressure into a first fluid path via the first hydraulic pump;

pumping hydraulic pressure into a second fluid path via the second hydraulic pump; and fluidly coupling the hydraulic valve to the second fluid path.

15. The method of claim 14, further comprising fluidly coupling the main hydraulic circuit and the hydraulic controls with the first fluid path.

16. The method of claim 14, further comprising fluidly coupling the first hydraulic pump to the hydraulic valve once the first fluid path reaches a full hydraulic capacity.

17. The method of claim 13, wherein the controlling the hydraulic pressure comprises providing a first portion of hydraulic pressure to the first clutch and a second portion of hydraulic pressure to the cooler circuit and the lube circuit.

18. The method of claim 13, further comprising:

providing a first amount of hydraulic pressure through a first flow path to the first clutch to selectively engage the first clutch; and providing a second amount of hydraulic pressure through a second flow path to the first clutch to selectively cool the first clutch during the launch condition;

wherein, the second hydraulic pump and hydraulic valve are controllably fluidly coupled to the second flow path.

* * * * *